US011372707B2

(12) United States Patent
Zhuang et al.

(10) Patent No.: US 11,372,707 B2
(45) Date of Patent: Jun. 28, 2022

(54) COGNITIVE PROBLEM ISOLATION IN QUICK PROVISION FAULT ANALYSIS

(71) Applicant: International Business Machines Corporation, Armonk, NY (US)

(72) Inventors: Yu Zhuang, Beijing (CN); Bo Chen Zhu, Beijing (CN); Xu Liu, Beijing (CN); Jun Su, Beijing (CN); Xu Bin Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 16/783,652

(22) Filed: Feb. 6, 2020

(65) Prior Publication Data

US 2021/0248022 A1   Aug. 12, 2021

(51) Int. Cl.
| *G06F 11/00* | (2006.01) |
| *G06F 11/07* | (2006.01) |
| *G06F 9/445* | (2018.01) |
| *G06F 9/50* | (2006.01) |

(52) U.S. Cl.
CPC ........ *G06F 11/079* (2013.01); *G06F 9/44526* (2013.01); *G06F 11/0709* (2013.01); *G06F 11/0751* (2013.01); *G06F 9/5077* (2013.01)

(58) Field of Classification Search
CPC ............... G06F 11/079; G06F 11/0709; G06F 11/0712; G06F 11/0751; G06F 11/3055; G06F 11/3058; G06F 11/3089
See application file for complete search history.

(56) References Cited

U.S. PATENT DOCUMENTS

| 8,103,760 | B2 | 1/2012 | Reedy |
| 9,128,792 | B2* | 9/2015 | Kimmet .................... G06F 8/61 |
| 9,558,093 | B2 | 1/2017 | Sadovsky |
| 9,667,470 | B2 | 5/2017 | Prathipati |
| 10,719,414 | B2* | 7/2020 | Giannetti .............. G06F 9/4881 |
| 2015/0058392 | A1 | 2/2015 | Krimchansky |
| 2017/0331668 | A1* | 11/2017 | Prathipati ........... G06F 11/3672 |
| 2018/0307514 | A1* | 10/2018 | Koutyrine ........... G06F 11/0706 |
| 2019/0124504 | A1* | 4/2019 | Tran .................... H04L 65/1073 |
| 2019/0260634 | A1* | 8/2019 | Wang ................. H04L 41/5051 |
| 2019/0361766 | A1* | 11/2019 | Cardoso ............. G06F 11/0778 |
| 2020/0241944 | A1* | 7/2020 | Derdak ................... G06F 9/547 |
| 2020/0351392 | A1* | 11/2020 | Bomma ................. H04L 67/22 |
| 2021/0191801 | A1* | 6/2021 | Lee ...................... G06Q 20/023 |

FOREIGN PATENT DOCUMENTS

CN           101394314 A        3/2009

* cited by examiner

*Primary Examiner* — Elmira Mehrmanesh
(74) *Attorney, Agent, or Firm* — Vanleeuwen & Vanleeuwen; Alexander G. Jochym (57) ABSTRACT

An approach is provided in which a set of provision information is generated from a set of provisioners that are in process of fulfilling a client's provision request. The approach creates a set of provision events based on the set of provision information and, in response to detecting a failure of the provision request, the approach generates a provision chain from the set of provision events. The provision chain links the set of provision events based on correlation rules and identifies at least one isolation point of the failure. The approach informs the client of the at least one isolation point of the failure identified in the provision chain.

20 Claims, 10 Drawing Sheets

COGNITIVE PROBLEM ISOLATION IN QUICK PROVISION FAULT ANALYSIS

BACKGROUND

Provisioning is the allocation of resources and services to a user. Cloud provisioning is based on procedures that specify how a user procures cloud services and resources from a cloud provider. Cloud services include infrastructure as a service, software as a service, and platform as a service. Cloud resources include processing resources, network resources, storage resources, and etcetera.

In current cloud architectures, a service provisioner includes multiple sub provisioners that support different types of activities. Identity and Access Management (IAM) is a framework of policies and technologies that ensure users in an enterprise have appropriate access to technology resources (e.g., an authentication manager for each provision operation). When a provision request reaches the service provisioner, a series of provision operations in the service provisioner occurs. For example, the service provisioner may trigger a provision operation based on the provision request, the service provisioner may trigger an IAM request for authentication, and/or a provision operation is triggered by other operations.

BRIEF SUMMARY

According to one embodiment of the present disclosure, an approach is provided in which a set of provision information is generated from a set of provisioners that are in process of fulfilling a client's provision request. The approach creates a set of provision events based on the set of provision information and, in response to detecting a failure of the provision request, the approach generates a provision chain from the set of provision events. The provision chain links the set of provision events based on correlation rules and identifies at least one isolation point of the failure. The approach informs the client of the at least one isolation point of the failure identified in the provision chain.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
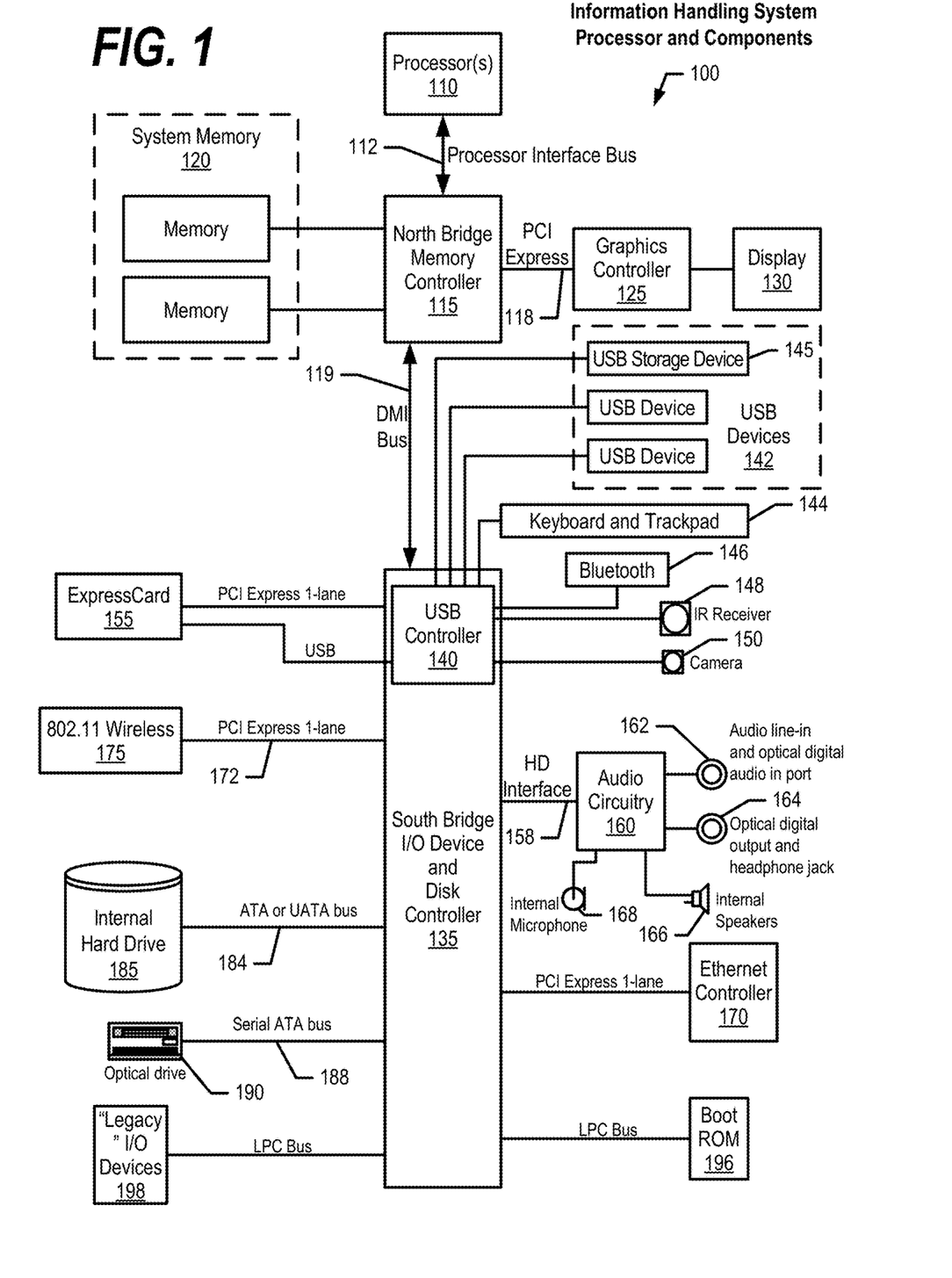
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
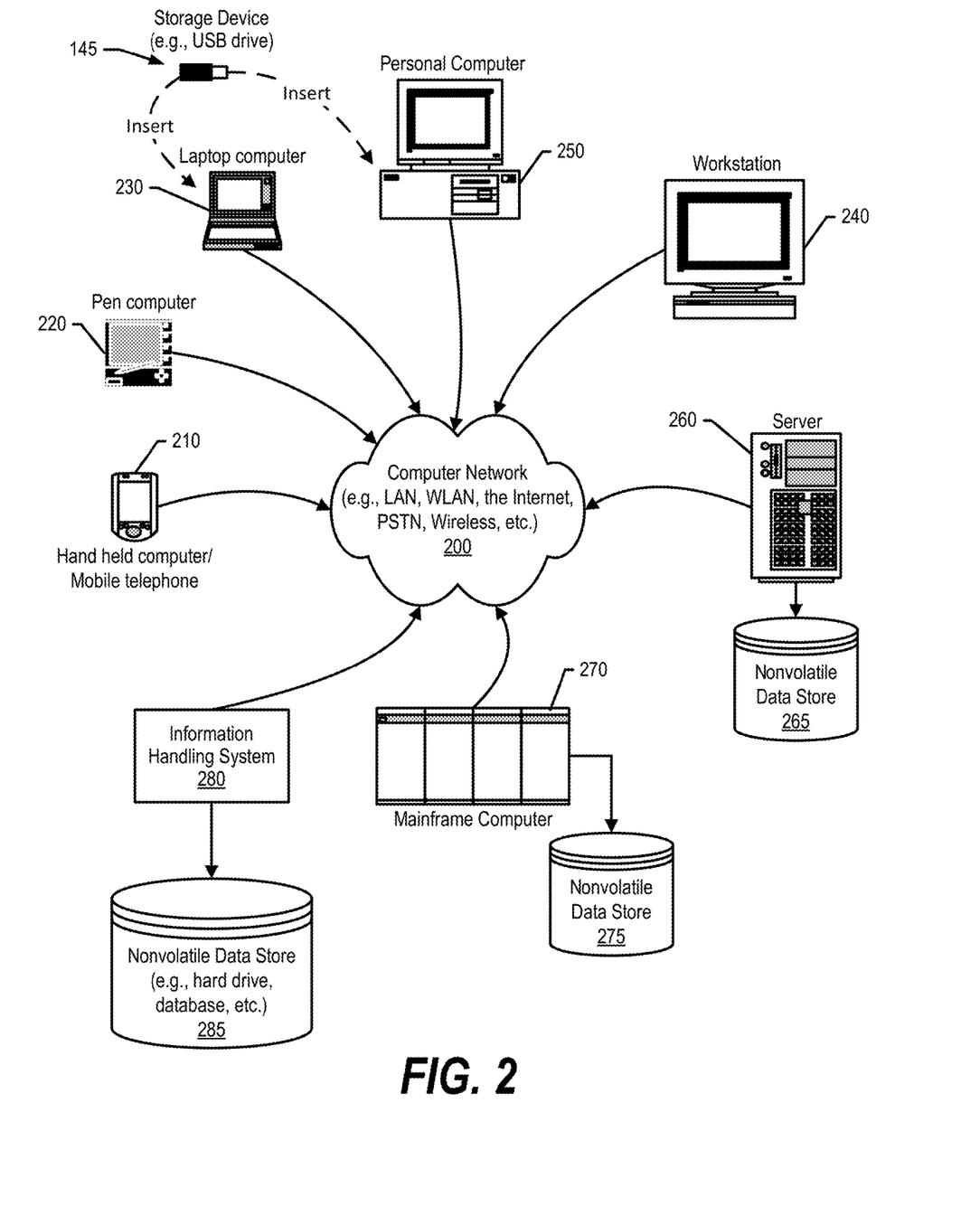
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, when a provision request reaches a service provisioner, a series of provision operations in the service provisioner occurs. A challenge found, however, is that multiple provision requests occur in parallel and relationships between operations in the same provision request are uncertain except for directly triggered associations. As a result, when a provision failure occurs, cloud architectures have difficulty in isolating the root cause of the provision failure.

FIGS. 3 through 9 depict an approach that can be executed on an information handling system that provides quick provision fault analysis and cognitive problem isolation. The approach introduces a method of problem isolation by generating provision chains and identifying a provision chain with abnormal status (e.g., provision failure). To generate the provision chain, the information handling system uses plugins to collect information from provisioners while fulfilling provision requests and create provision events from the collected information. The information handling system then uses correlation rules to select events of a provision operation, analyze the events for correlation between different provisioners, and aggregate the events of the provision between the same provisioner into a provision chain. In turn, the information handling system uses the provision chain to identify isolation points of the provision request failure and inform a client of the isolation points.

Figure 3:
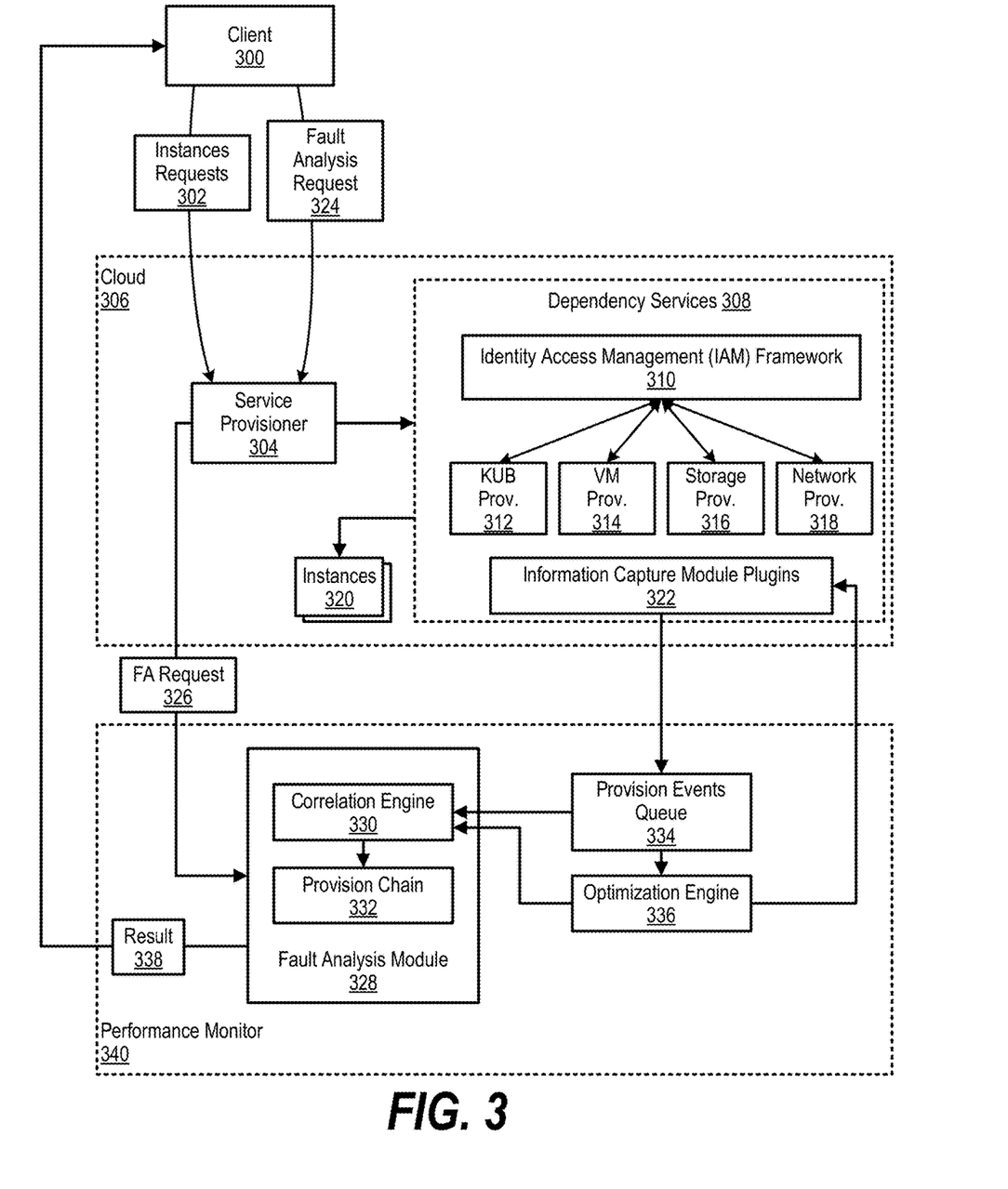
FIG. 3 is an exemplary diagram depicting a performance monitor generating provision chains and using the provision chains to identify root causes of provision request failures.

FIG. 3 is an exemplary diagram depicting a performance monitor generating provision chains and using the provision chains to identify root causes of provision request failures.

Client 300 sends instances requests 302 to service provisioner 304 executing in cloud 306. Service provisioner 304 interacts with dependency services 308 to fulfill instances requests 302. Dependency services 308 includes identity access management (IAM) framework 310, which interacts with, in one embodiment, kubernetes provisioner 312, virtual machine provisioner 314, storage provisioner 316, and network provisioner 318. In turn, dependency services 308 generate instances 320 for client 300 to utilize.

During the provision request fulfillment process, information capture module plugins 322 capture information pertaining to the provisioning process and send the information to provision events queue 334 within performance monitor 340. In one embodiment, information capture module plugins 322 capture the provision information from each of provisioners 312 through 318, such as requester id, provisioner name, instance id, timestamp, serving instance id, and status. Information capture module plugins 322 also capture authorization information from IAM framework 310, such as requester id, resource id, timestamp, serving instance id, and status. In turn, information capture module plugins 322 generate event data based on the captured information and send the event data to provision events queue 334 where provision events queue 334 persists all of the provision events accordingly (see FIGS. 4, 5, and corresponding text for further details).

When client 300 detects a provision request failure, client 300 sends fault analysis request 324 to service provisioner 304. In one embodiment, service provisioner 304 detects the provision request failure. Service provisioner 304 then sends fault analysis request 326 to fault analysis module 328 to begin the fault analysis process.

Correlation engine 330 retrieves the provision event information from provision events queue 334 and generates provision chains 332 based pm a set pf correlation rules (see FIGS. 7-10 and corresponding text for further details). In turn, fault analysis module 328 sends results 338 to client 300 that indicates which provisioner had a problem to break the provision chain.

In one embodiment, provision events queue 334 sends information to optimization engine 336. Optimization engine 336, after running for some time, checks whether removing a parameter for a type of certain correlation will cause error outputs. If no conflict exists, optimization engine 336 removes the parameter in both information capture module plugins 322 and correlation engine 330 to optimize the performance of the event capture and analysis process.

Figure 4:
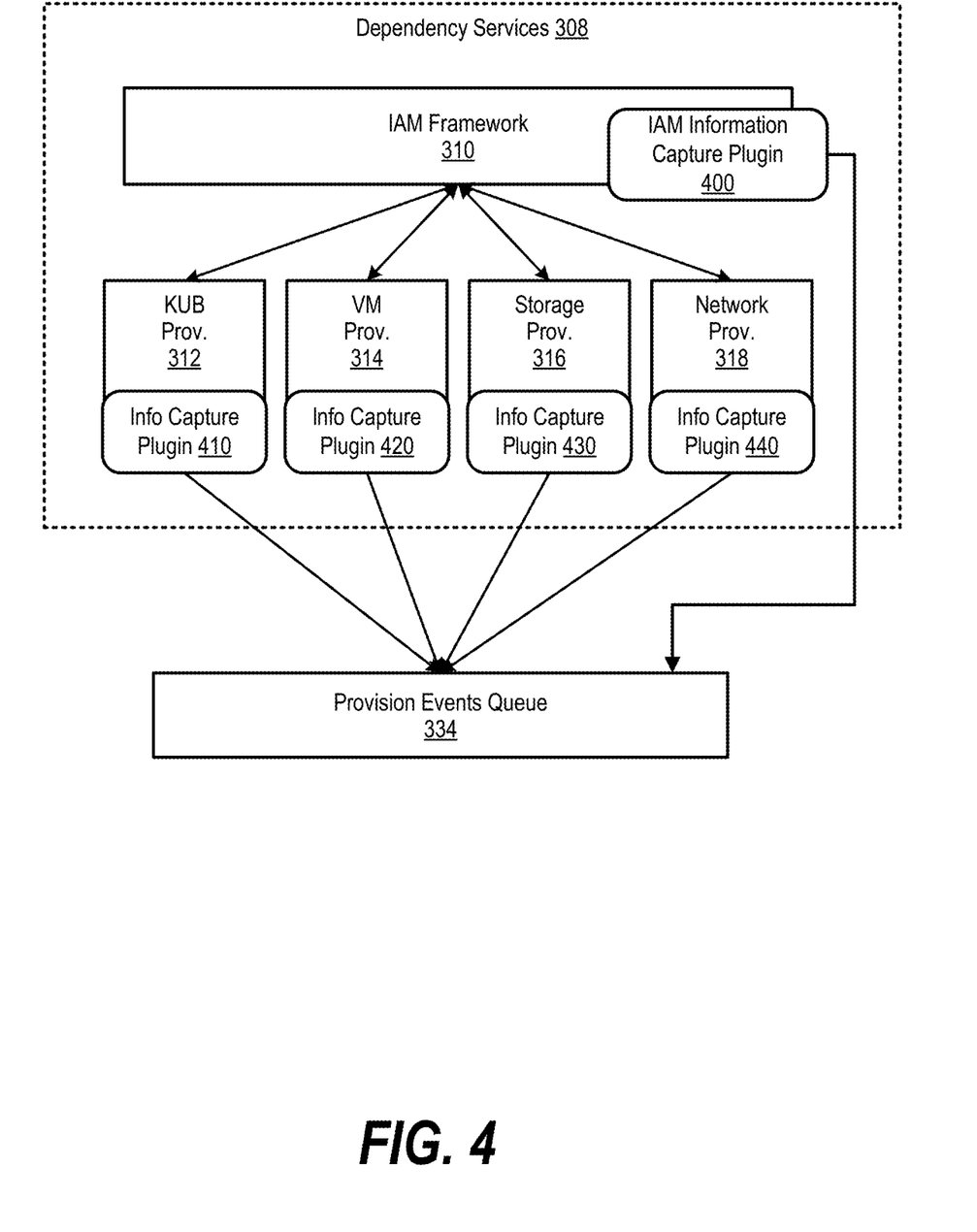
FIG. 4 is an exemplary diagram depicting details of information capture module plugins.

FIG. 4 is an exemplary diagram depicting details of information capture module plugins 322. Information capture module plugins 322 include IAM information capture plugin 400 and information capture plugins 410, 420, 430, and 440. IAM information capture plugin 400 captures information pertaining to IAM framework 310, and information capture plugins 410-440 capture information pertaining to their respective resource provisioners 312-318.

Figure 5:
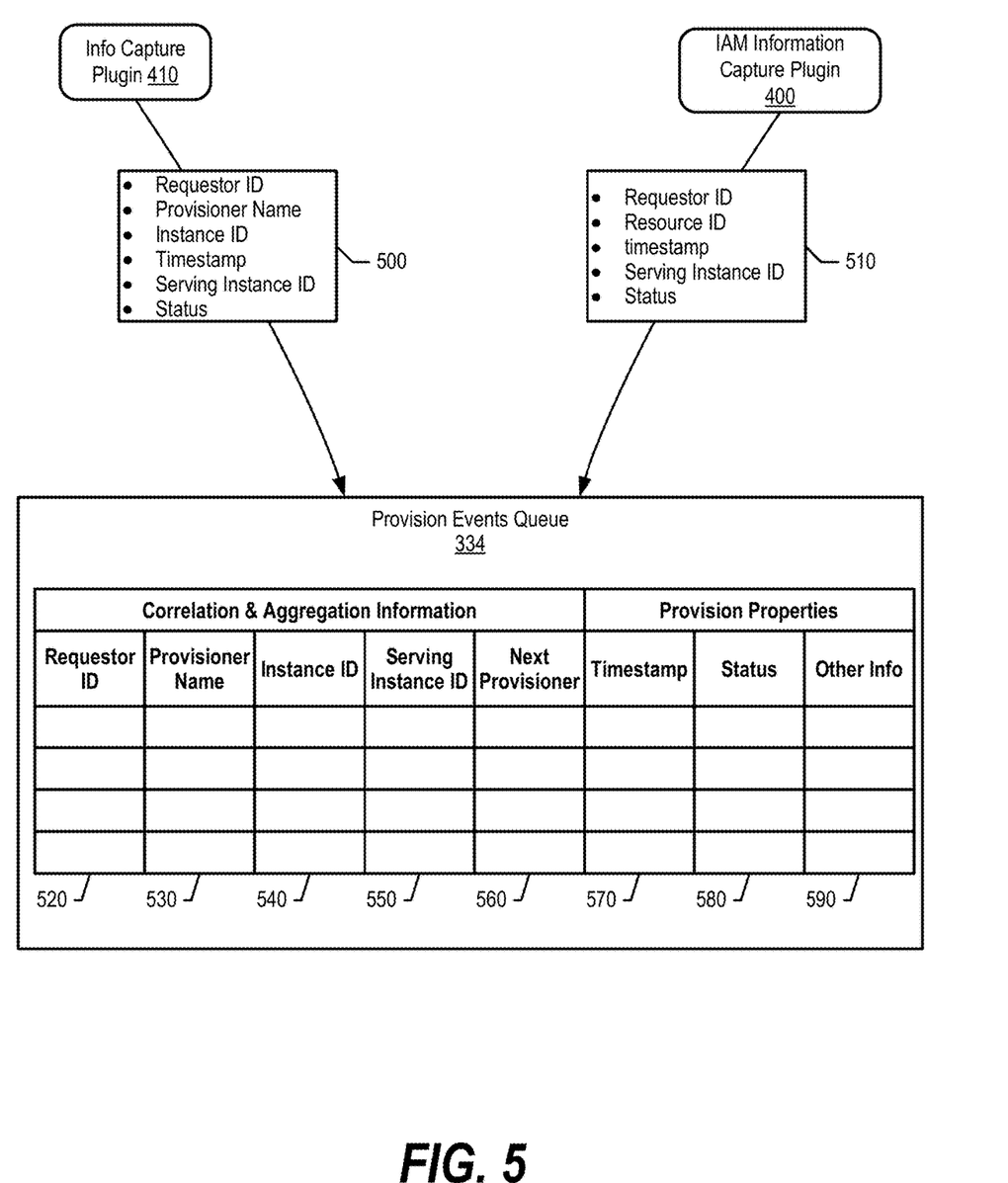
FIG. 5 is an exemplary diagram depicting provisioning event data aggregated into a provisioning events queue.

Each of plugins 400-440 captures the required information, forms the captured information into provision event data, and sends the provision event data to provision events queue 334 (see FIG. 5 and corresponding text for further details).

In one embodiment, plugins 400-440 include two types of plugin implementations. A first type of plugin is an HTTP proxy. The HTTP proxy parses http headers and captures information to generate provision events. A second type of plugin is a library that builds inside a provisioner and IAM framework to provide an interface to generate provision events. This plugin type combines raw data of the provision events into data transform records (e.g., JSON) that are sent to provision events queue 334.

FIG. 5 is an exemplary diagram depicting provisioning event data aggregated into a provisioning events queue. Information capture plugin 410 (along with plugins 420-440) send event data 500 to provision events queue 334. Likewise, IAM information capture plugin 400 sends event data 510 to provision events queue 334.

Provision events queue 334 aggregates the event data into two sets of information, which are correlation and aggregation information (columns 520, 530, 540, 550, and 560) and provision properties (columns 570, 580, and 590). The correlation and aggregation information include requester ID column 520, which includes IDs of end users who trigger the provision request. Provisioner name column 530 includes names of provisioners in IAM framework 310 that are also abstracted to be a provisioner. Instance ID column 540 includes IDs of instances that are provisioned by a provisioner. Serving instance ID column 550 includes IDs that trigger provisions to occur. In one embodiment a service instance provision may provision several lower layer service instances as part of components. For example, kubernetes provisioner 312 may need to provision virtual machine (VM) provisioner 314 and storage provisioner 316 as dependencies. Next provisioner column 560 includes names of a next provisioner of the provision request.

The provision properties information includes timestamp column 570 that includes timestamps of when provision events are generated. Status column 580 includes flags that indicate whether the provision starts or completes. Other information column 590 includes other user required information.

Figure 6:
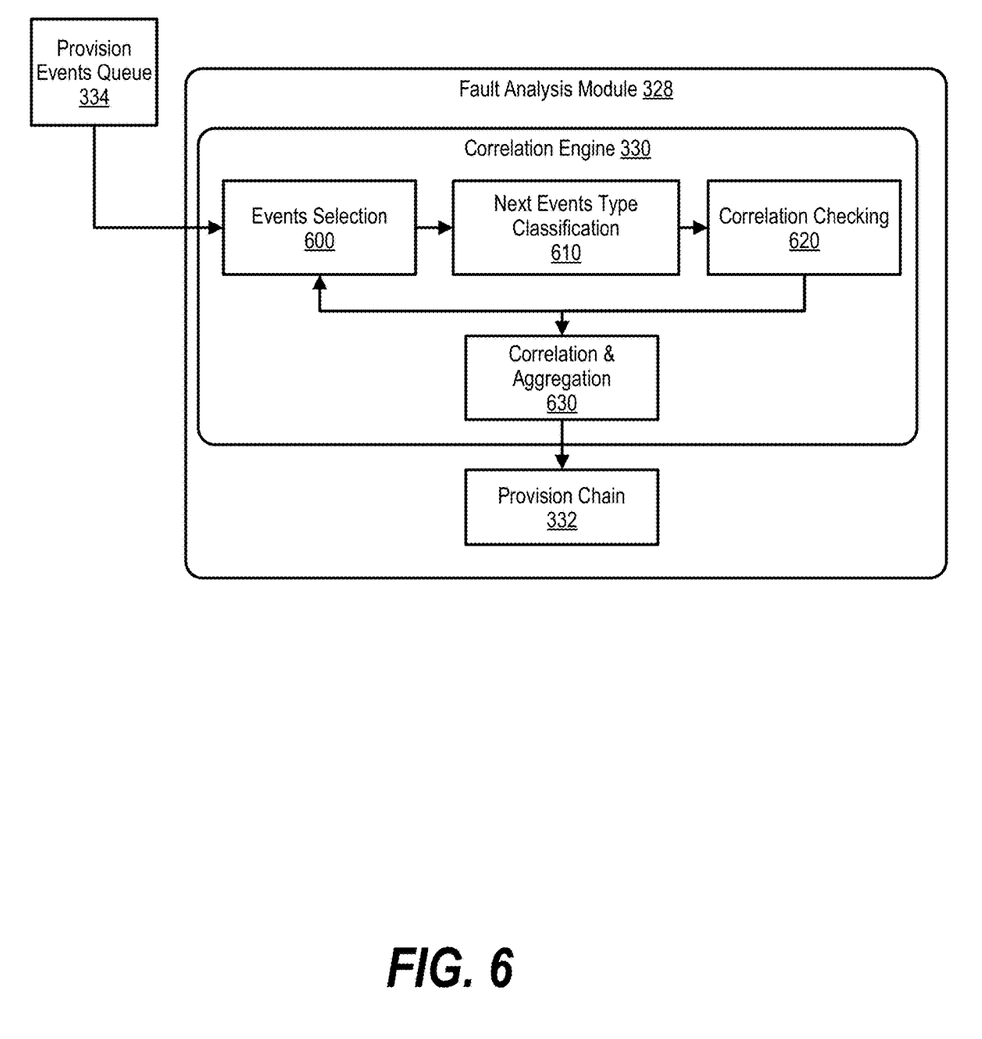
FIG. 6 is an exemplary diagram depicting a fault analysis module generating a provision chain from provision events.

FIG. 6 is an exemplary diagram depicting a fault analysis module generating a provision chain from provision events.

Correlation engine 330 includes events selection 600, next events type classification 610, correlation checking 620, and correlation & aggregation 630. In response to receiving fault analysis request 326, events selection 600 selects each of the events from provision events queue 334 related to user entry points (e.g., components that are first accessed). Next events type classification 610 checks the next type of the event in provisioner from the events. Correlation rule checking 620 checks if there are events that fulfill a correlation rule. In one embodiment, the correlation rule default is "Requester id=selected.request id;" "Serving instance id=selected.instance id."

If a correlation rule is fulfilled, then correlation checking 620 interacts with events selection 600 to select all the events from provision events queue 334. If the correlation rule is not fulfilled, then correlation checking 620 interacts with correlation and aggregation 630 to generate a link between events that fulfill the correlation and aggregate the events that fulfill a criterion, such as "Requester id & same Provisioner & same instance id" (see FIG. 8 and corresponding text for further details).

Correlation and aggregation 630 generates links between each of the events that fulfill the correlation. Correlation and aggregation 630 aggregates each if the events that fulfill the same 'Requester id & same Provisioner & same instance id' into the same node and rewrites their status as: 'start→completed→failed.' In turn, correlation and aggregation 630 generates provision chain 332 that identifies isolation points of failure (see FIGS. 9, 10, and corresponding text for further details).

Figure 7:
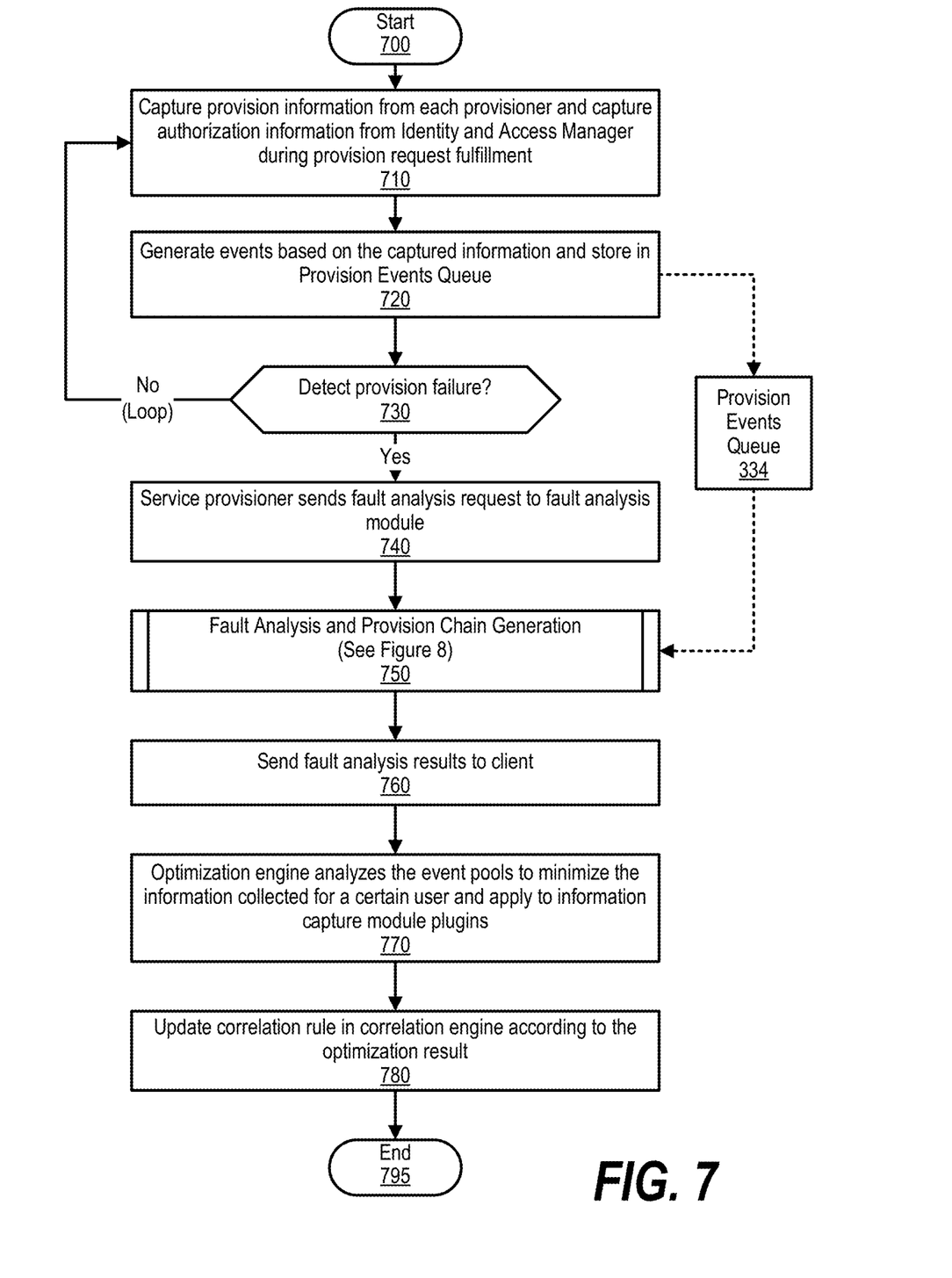
FIG. 7 is an exemplary flowchart depicting steps taken to capture provision event information and identify isolation points of failures based on generated provision chains.

FIG. 7 is an exemplary flowchart depicting steps taken to capture provision event information and identify isolation points of failures based on generated provision chains. FIG. 7 processing commences at 700 whereupon, at step 710, the process captures provision information from each of provisioners 312-318 and captures authorization information from IAM framework 310 during provision request fulfillments.

At step 720, the process generates event data based on the captured information and stores the events in provision events queue 334 (see FIG. 5 and corresponding text for further details). The process determines as to whether the process receives a fault analysis request 324 (decision 730). If the process did not received a fault analysis request 324, then decision 730 branches to the 'no' branch which loops back to continue to capture provision information. This looping continues until the process receives a fault analysis request 324, at which point decision 730 branches to the 'yes' branch exiting the loop.

At step 740, the process (e.g., services provisioner 304) sends fault analysis request 326 to fault analysis module 328. At predefined process 750, the process performs correlation analysis and provision chain generation steps (see FIG. 8 and corresponding text for processing details). At step 760, the process sends fault analysis results 338 to client 300 based on the generated provision chains. In one embodiment, the process sends a detailed provision chain such as the example shown in FIG. 9. In another embodiment, the process sends a refined provision chain such as the example shown in FIG. 10.

At step 770, in one embodiment, the process uses optimization engine 336 to analyze the provision event data and identify ways in which to minimize future information collected for a certain user, which optimization engine 336 applies to the information capture module plugins. In addition, at step 780, the process updates correlation rules in correlation engine 330 according to the optimization results. FIG. 7 processing thereafter ends at 795.

Figure 8:
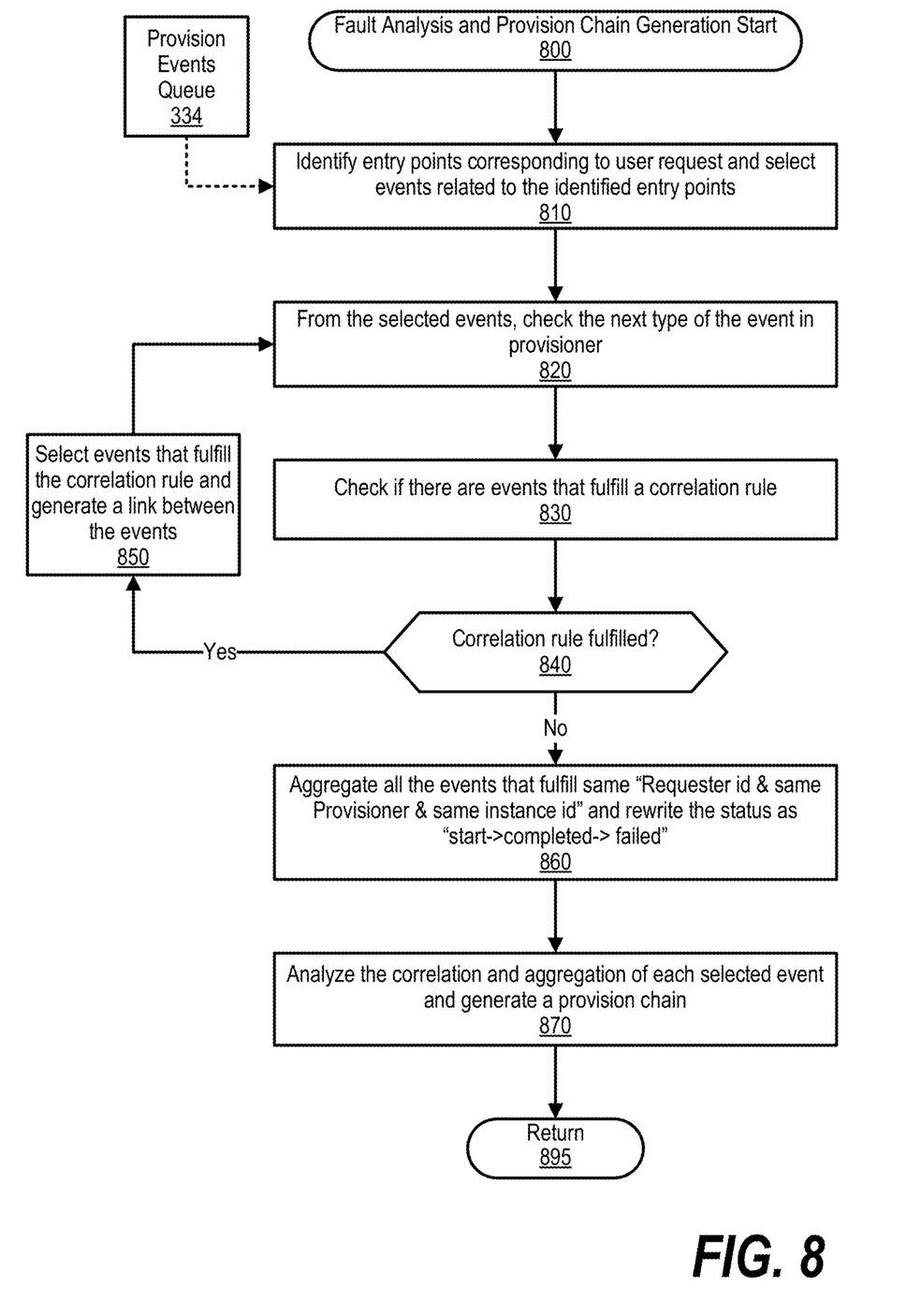
FIG. 8 is an exemplary flowchart depicting steps taken to generate a provision chain based on provision events.

FIG. 8 is an exemplary flowchart depicting steps taken to generate a provision chain based on provision events. FIG. 8 processing commences at 800 whereupon, at step 810, the process identifies entry points corresponding to user requests and selects events related to the identified entry points.

At step 820, the process identifies a next provisioner corresponding to the provision events (column 560 in FIG. 5) and, at step 830, the process checks if there are events that fulfill a correlation rule. For example, if the next provisioner is identified as IAM framework 310, only the type IAM framework 310 events are selected for the next check.

The process determines as to whether a correlation rule is fulfilled (decision 840). If a correlation rule is fulfilled, then decision 840 branches to the 'yes' branch which loops back to select the events that fulfill the correlation rule and generate links between the previous events and the selected events (step 850). Then, for each of the selected events, the process repeats the step to check the next link (step 820). This looping continues until there are no more events that fulfill a correlation rule, at which point decision 840 branches to the 'no' branch exiting the loop.

At step 860, in one embodiment, the process aggregates each of the events that fulfill same "Requester id & same Provisioner & same instance id" combination and rewrites the status as start→completed→failed. At step 870, the process analyzes the correlation and aggregation of each selected event and generates a provision chain accordingly (see FIGS. 9, 10, and corresponding text for further details). FIG. 8 processing thereafter returns to the calling routine (see FIG. 7) at 895.

Figure 9:
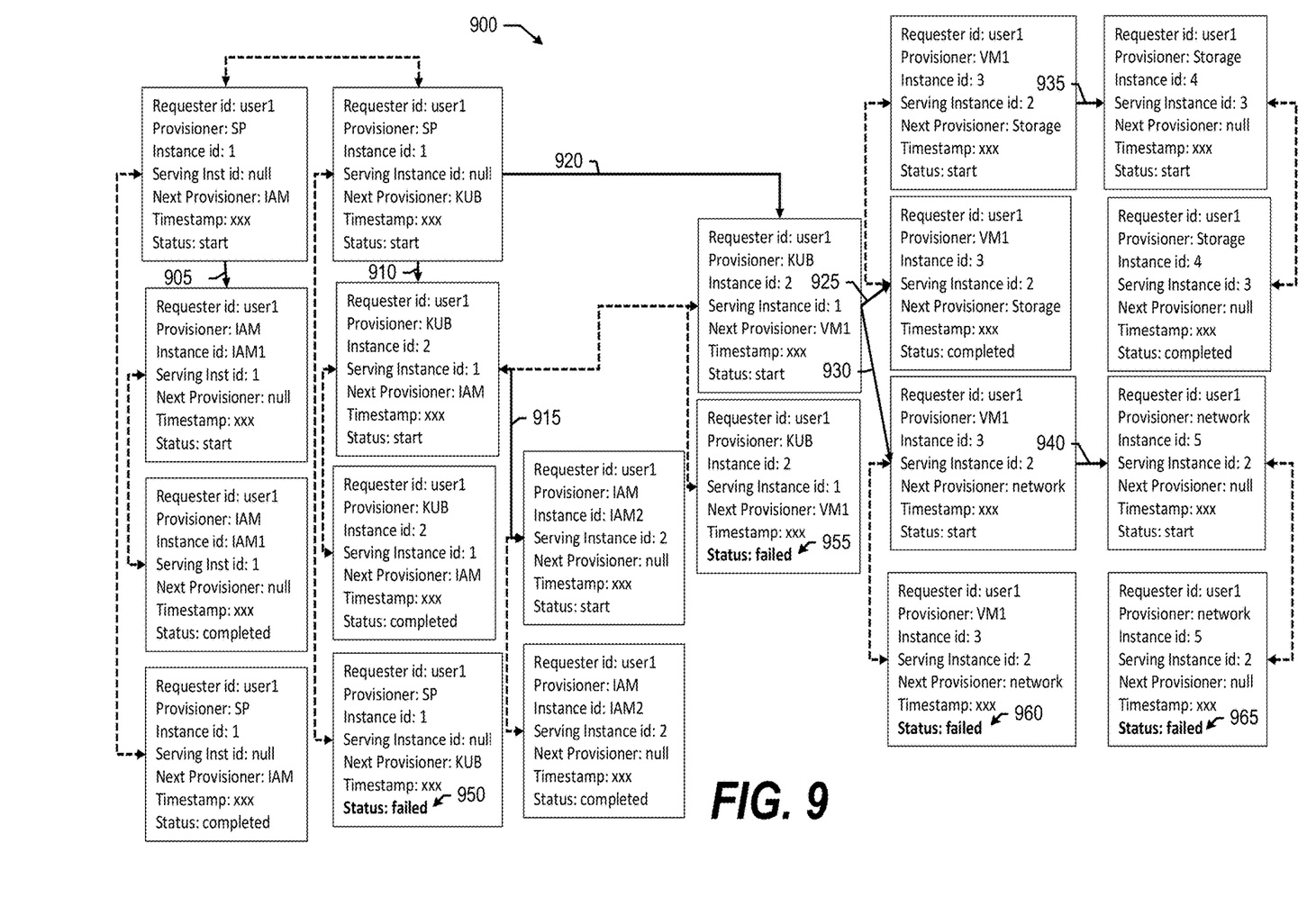
FIG. 9 is an exemplary diagram depicting a detailed provision chain result.

FIG. 9 is an exemplary diagram depicting a detailed provision chain result. Provision chain 900 includes (i) details of each provision event; (ii) links between various provision events based on correlation rules discussed herein (905, 910, 915, 920, 925, 930, 935, and 940); (iii) provision event aggregations (dashed lines) and (iv) isolation points of failure (950, 955, 960, and 965) within various provision events. In one embodiment, the approach discussed herein aggregates provision chain 900 into an easily viewable provision chain such as that shown in FIG. 10.

Figure 10:
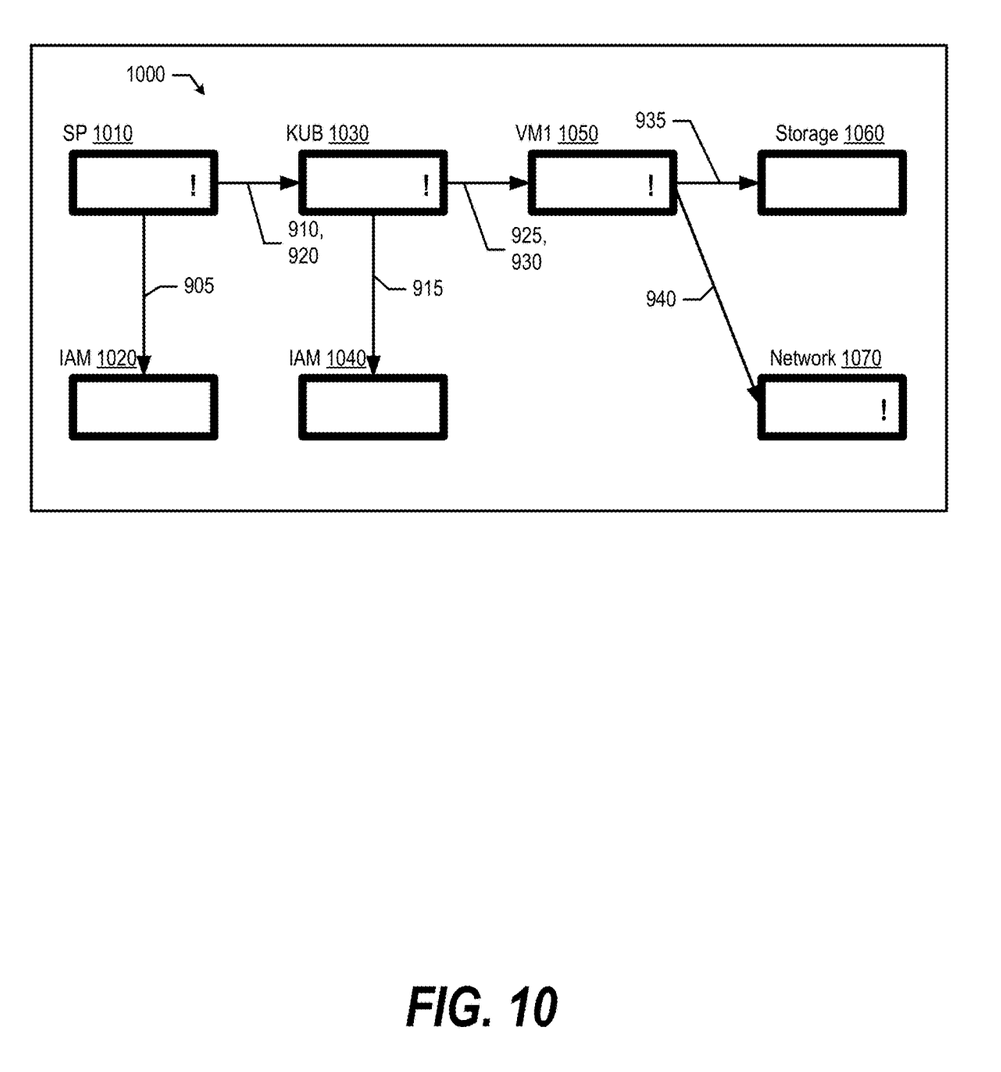
FIG. 10 is an exemplary diagram depicting a refined provision chain.

FIG. 10 is an exemplary diagram depicting a refined provision chain. Fault analysis module 328 aggregates all the provision events that fulfill the same "Requester ID, Provisioner, instance ID" and generates a simplified provision chain topology 1000. Topology 1000 includes service provisioner icon 1010, IAM icon 1020, kubernetes provisioner icon 1030, IAM icon 1040, VM1 provisioner icon 1050, storage provisioner icon 1060, and network provisioner icon 1070. In addition, topology 1000 includes links 905-940 that match links 905-940 shown in FIG. 9.

In the embodiment shown in FIG. 10, topology 1000 includes "!" within provisioner icons that correspond to isolation points of failure 950, 955, 960, and 965 shown in FIG. 9. Topology 1000 shows that the failure isolation points lie in a network provisioning from network provisioner 318 initiated by VM1 provisioner 314. As a result, a user focuses efforts on correcting the provisioning request failure instead of analyzing each provision event generated from the provision request.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    creating a set of provision events from a set of provision information, wherein the set of provision information is generated from a set of provisioners in process of fulfilling a provision request from a client, and wherein the set of provision events comprise a first provision event and a second provision event;

generating a provision chain from the set of provision events in response to detecting a failure of the provision request, wherein the provision chain links the set of provision events based on one or more correlation rules and identifies at least one isolation point of the failure, and wherein the provision chain indicates a first provisioner initiating the first provision event to a second provisioner and the second provisioner initiating the second provision event to a third provisioner in response to receiving the first provision event;

determining that the at least one isolation point of failure is from the third provisioner; and informing the client that the at least one isolation point of the failure is from the third provisioner.

2. The method of claim 1 further comprising:

determining that the second provisioner is an initiator of the second provision event; and linking the second provision event to the first provision event in response to the determination.

3. The method of claim 2 wherein at least one of the one or more correlation rules require the first provision event and the second provision event to comprise a matching requestor identifier corresponding to the client.

4. The method of claim 2 further comprising:

wherein the first provision event comprises a first requestor identifier corresponding to the client, a first provisioner identifier corresponding to the first provisioner, and a first instance identifier corresponding to the first provisioner;

wherein a third provision event from the set of provision events comprises a second requestor identifier, a second provisioner identifier, and a second instance identifier; and aggregating the first provision event with the third provision event in response to determining that the first requestor identifier matches the second requestor identifier, the first provisioner identifier matches the second provision identifier, and the first instance identifier matches the second instance identifier.

5. The method of claim 1 further comprising:

assigning a set of plugins to the set of provisioners, and capturing, by each of the set of plugins, the set of provision information from its assigned provisioner while in process of fulfilling the provision request.

6. The method of claim 1 wherein at least one of the set of provisioners is a service provisioner, a resource provisioner, and an IAM framework.

7. The method of claim 1 further comprising:

optimizing a set of plugins based on the created set of provision events to capture a future set of provision information from the set of provisioners; and optimizing the one or more correlation rules based on the created set of provision events.

8. An information handling system comprising:

one or more processors;

a memory coupled to at least one of the processors;

a set of computer program instructions stored in the memory and executed by at least one of the processors in order to perform actions of:

creating a set of provision events from a set of provision information, wherein the set of provision information is generated from a set of provisioners in process of fulfilling a provision request from a client, and wherein the set of provision events comprise a first provision event and a second provision event;

generating a provision chain from the set of provision events in response to detecting a failure of the provision request, wherein the provision chain links the set of provision events based on one or more correlation rules and identifies at least one isolation point of the failure, and wherein the provision chain indicates a first provisioner initiating the first provision event to a second provisioner and the second provisioner initiating the second provision event to a third provisioner in response to receiving the first provision event;

determining that the at least one isolation point of failure is from the third provisioner; and informing the client that the at least one isolation point of the failure is from the third provisioner.

9. The information handling system of claim 8 wherein the processors perform additional actions comprising:

determining that the second provisioner is an initiator of the second provision event; and linking the second provision event to the first provision event in response to the determination.

10. The information handling system of claim 9 wherein at least one of the one or more correlation rules require the first provision event and the second provision event to comprise a matching requestor identifier corresponding to the client.

11. The information handling system of claim 9 wherein the processors perform additional actions comprising:

wherein the first provision event comprises a first requestor identifier corresponding to the client, a first provisioner identifier corresponding to the first provisioner, and a first instance identifier corresponding to the first provisioner;

wherein a third provision event from the set of provision events comprises a second requestor identifier, a second provisioner identifier, and a second instance identifier; and aggregating the first provision event with the third provision event in response to determining that the first requestor identifier matches the second requestor identifier, the first provisioner identifier matches the second provision identifier, and the first instance identifier matches the second instance identifier.

12. The information handling system of claim 8 wherein the processors perform additional actions comprising:

assigning a set of plugins to the set of provisioners, and capturing, by each of the set of plugins, the set of provision information from its assigned provisioner while in process of fulfilling the provision request.

13. The information handling system of claim 8 wherein at least one of the set of provisioners is a service provisioner, a resource provisioner, and an IAM framework.

14. The information handling system of claim 8 wherein the processors perform additional actions comprising:

optimizing a set of plugins based on the created set of provision events to capture a future set of provision information from the set of provisioners; and optimizing the one or more correlation rules based on the created set of provision events.

15. A computer program product comprising a computer readable storage medium, wherein the computer program product comprises computer program code that, when executed by an information handling system, causes the information handling system to perform actions comprising:

creating a set of provision events from a set of provision information, wherein the set of provision information is generated from a set of provisioners in process of fulfilling a provision request from a client, and wherein the set of provision events comprise a first provision event and a second provision event;

generating a provision chain from the set of provision events in response to detecting a failure of the provision request, wherein the provision chain links the set of provision events based on one or more correlation rules and identifies at least one isolation point of the failure, and wherein the provision chain indicates a first provisioner initiating the first provision event to a second provisioner and the second provisioner initiating the second provision event to a third provisioner in response to receiving the first provision event;

determining that the at least one isolation point of failure is from the third provisioner; and informing the client that the at least one isolation point of the failure is from the third provisioner.

16. The computer program product of claim 15 wherein the information handling system performs further actions comprising:

determining that the second provisioner is an initiator of the second provision event; and linking the second provision event to the first provision event in response to the determination.

17. The computer program product of claim 16 wherein at least one of the one or more correlation rules require the first provision event and the second provision event to comprise a matching requestor identifier corresponding to the client.

18. The computer program product of claim 16 wherein the information handling system performs further actions comprising:

wherein the first provision event comprises a first requestor identifier corresponding to the client, a first provisioner identifier corresponding to the first provisioner, and a first instance identifier corresponding to the first provisioner;

wherein a third provision event from the set of provision events comprises a second requestor identifier, a second provisioner identifier, and a second instance identifier; and aggregating the first provision event with the third provision event in response to determining that the first requestor identifier matches the second requestor identifier, the first provisioner identifier matches the second provision identifier, and the first instance identifier matches the second instance identifier.

19. The computer program product of claim 15 wherein the information handling system performs further actions comprising:

assigning a set of plugins to the set of provisioners, and capturing, by each of the set of plugins, the set of provision information from its assigned provisioner while in process of fulfilling the provision request.

20. The computer program product of claim 15 wherein the information handling system performs further actions comprising:

optimizing a set of plugins based on the created set of provision events to capture a future set of provision information from the set of provisioners; and optimizing the one or more correlation rules based on the created set of provision events.

* * * * *